United States Patent [19]
Rubin et al.

[11] Patent Number: 5,220,492
[45] Date of Patent: Jun. 15, 1993

[54] INVERTER AND POWER SUPPLY SYSTEMS INCLUDING SAME

[75] Inventors: Daniel Rubin, Nes Ziona; Dimitri Dobrenko, Raanana; Rafael Mogilner, Rehovot, all of Israel

[73] Assignee: Systel Development and Industries Ltd., Rehovot, Israel

[21] Appl. No.: 766,917

[22] Filed: Sep. 27, 1991

Related U.S. Application Data

[63] Continuation of Ser. No. 502,891, Apr. 2, 1990, abandoned.

[30] Foreign Application Priority Data

Dec. 26, 1989 [IL] Israel ........................... 92885

[51] Int. Cl.$^5$ .................................... H02M 3/335
[52] U.S. Cl. .............................. 363/21; 363/97; 363/132; 363/133
[58] Field of Search ............ 363/20, 21, 56, 95, 363/97, 127, 131, 132, 133, 8; 350/332

[56] References Cited

U.S. PATENT DOCUMENTS

| | | | |
|---|---|---|---|
| 3,559,031 | 1/1971 | Vigna | 363/56 |
| 4,189,764 | 2/1980 | Snyder | 363/21 |
| 4,213,173 | 7/1980 | Link et al. | 363/163 |
| 4,578,744 | 3/1986 | Antula | 363/97 |
| 4,638,176 | 1/1987 | Martinelli | 363/97 |
| 4,739,462 | 4/1988 | Farnsworth et al. | 363/56 |
| 4,920,470 | 4/1990 | Clements | 363/21 |

FOREIGN PATENT DOCUMENTS

| | | | |
|---|---|---|---|
| 0042345 | 4/1978 | Japan | 363/20 |
| 0066283 | 5/1980 | Japan | 363/20 |
| 59-25580 | 2/1984 | Japan | . |
| 0148374 | 8/1985 | Japan | 363/20 |

OTHER PUBLICATIONS

PCI Proceedings, Oct. 1985, pp. 84–98; Hamamsy & Middlebrook.

*Primary Examiner*—Steven L. Stephan
*Assistant Examiner*—Adolf Berhane
*Attorney, Agent, or Firm*—Bejamin J. Barish

[57] ABSTRACT

An inverter for supplying electrical energy from a DC supply to a load, includes a flyback transformer having a primary winding circuit coupled to the DC supply, and a secondary winding circuit coupled to the load. The primary winding circuit includes a first switch for interrupting the DC supply causing energy to be stored in the transformer, and the secondary winding circuit includes a second, unidirectional switch to produce an output of one sign when closed. The primary winding circuit further includes an electrical device effective to return energy to the DC supply only when the first and second switches are open.

29 Claims, 9 Drawing Sheets

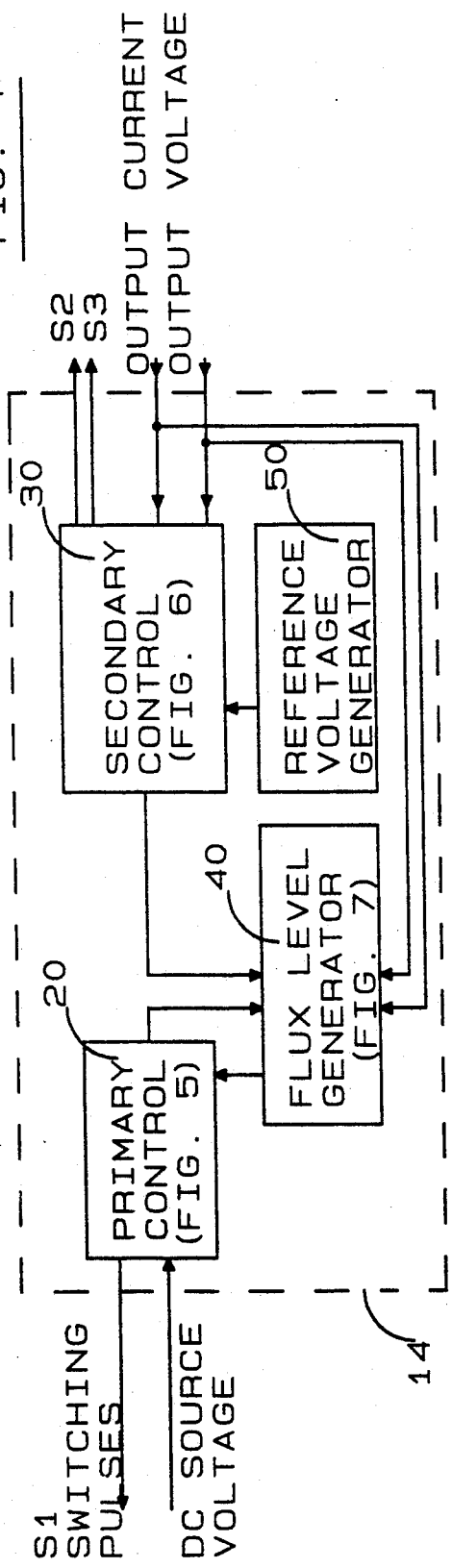
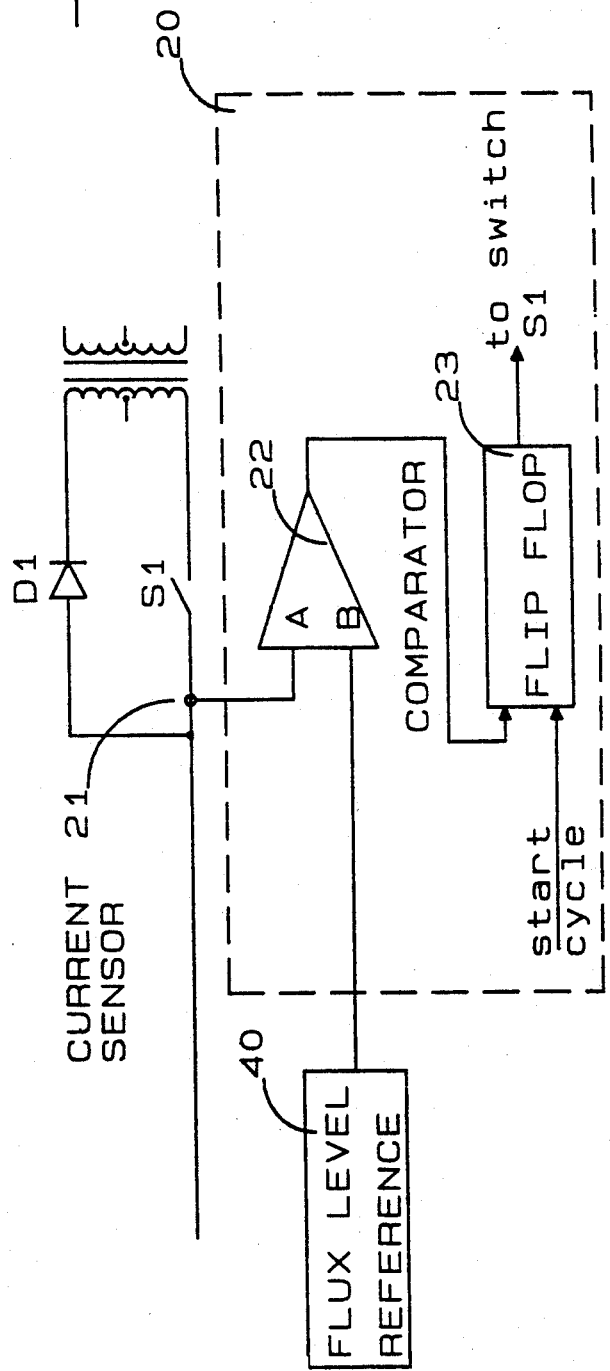
FIG. 4
FIG. 5

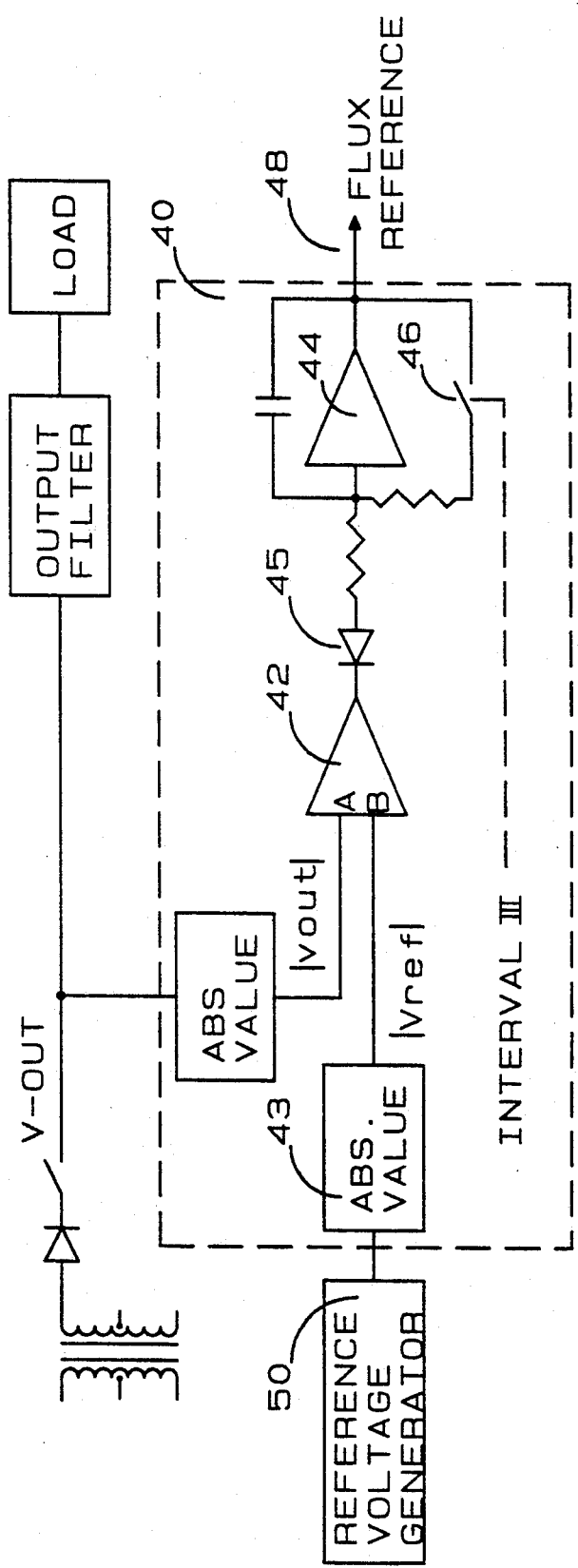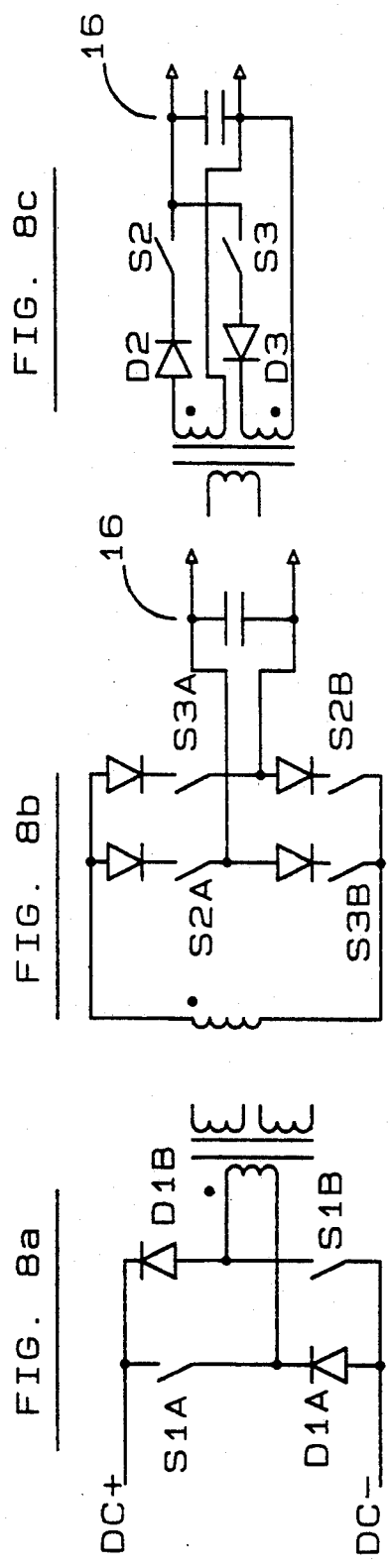

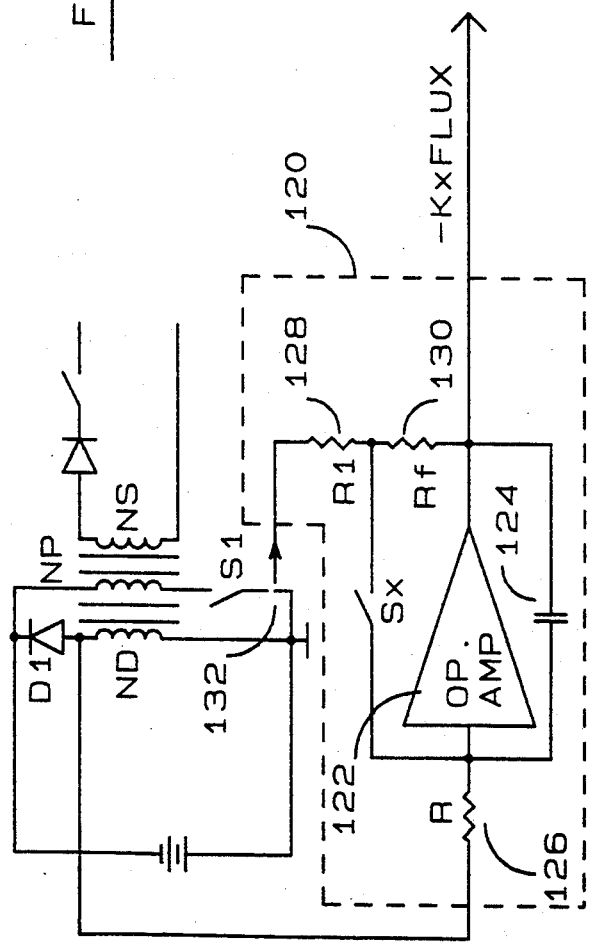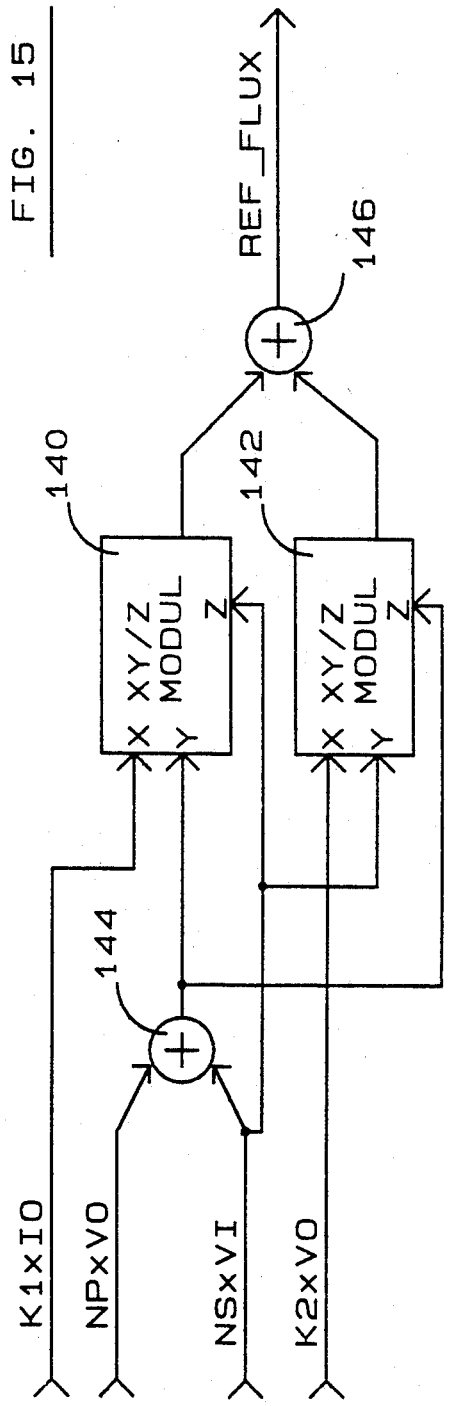

INVERTER AND POWER SUPPLY SYSTEMS INCLUDING SAME

This application is a continuation of application Sere. No. 07/502,891, filed Apr. 2, 1990, now abandoned.

BACKGROUND OF THE INVENTION

The present invention relates to an inverter for supplying electrical energy from a DC supply to a load. The invention may also be advantageously used in uninterrupted power supplies and standby power supplies, and is therefore described below also with respect to these applications.

Many forms of inverter circuits are known for converting DC to AC. One known circuit, called the "flyback" type, and described for example in the article "A New Family of Single-Phase and Three-Phase Inverters" by Sayed-Amr El-Hamamsy and R. D. Middlebrook, PCI, October, 1985 Proceedings, Pages 84–98, includes a transformer having a primary winding coupled to the DC supply and a switch for interrupting the DC supply, causing energy to be stored in the transformer, which energy is outputted from the secondary winding.

In the "fly-back" type of inverter, current flows in the secondary winding only when no current flows in the primary winding, and no current flows in thee secondary winding when current flows in the primary winding. The "flyback" type of inverter is therefore to be distinguished from the "forward" (or "push-pull") type inverter, in which current flows in the secondary winding whenever current flows in the primary winding, and no current flows in thee secondary winding when no current flows in the primary winding.

An object of the present invention is to provide an inverter particularly of the "flyback" type, but having a number of advantages, as will be described more particularly below.

Other objects of the invention are to provide an uninterrupted power supply and also a standby power supply utilizing the novel inverter.

According to the present invention, there is provided an inverter for supplying electrical energy from a DC supply to a load, comprising a transformer including a primary winding circuit coupled to the DC supply, and a secondary winding circuit coupled to the load. The primary winding circuit includes a first controlled switch for interrupting the DC supply; and the secondary winding circuit including at least a second, unidirectional controlled switch to produce an output of one sign when closed. The primary winding circuit further includes an electrical device effective to return energy to the DC supply only and always when the first and second switches are open; and a control circuit for separately and independently controlling the operation of the first and second switches to open and close them, at the same frequency, such that during one interval in each cycle the switch in the primary winding is closed to produce an excess of energy which is stored in the transformer, an during another interval in each cycle the switches in the primary winding and the secondary winding are open and the excess energy stored in the transformer is returned to the DC supply. Such an arrangement permits fast and stable control of the inverter.

The invention is particularly useful in, and is therefore described below with respect to, inverters in which thee transformer is a flyback transformer. In such transformers, the primary and secondary winding circuits have polarities such that there is current flow in the secondary winding circuit when no current flows in the primary winding circuit, and no current flow in the secondary winding circuit when there is current flow in the primary winding circuit.

In several preferred embodiments of the invention described below, thee secondary winding circuit includes a third, unidirectional switch poled in the opposite direction as the second switch, such as to produce, when it is the active switch in the secondary winding circuit instead of the second switch, and is closed, an output of the opposite sign as said second switch.

According to another important feature in preferred embodiments of the invention described below, the control circuit includes: means for closing the first switch and opening the second or third switch to start a first Interval in each cycle during which energy is stored in the transformer; means operative at the end of the first Interval to open the first switch and to close the active second or third switch to start a second Interval in each cycle during which energy stored in the transformer is delivered to the load or, in the case of a reactive load, energy in the load is stored in the transformer; and means operative at the end of the second Interval to open all the switches to start a third Interval during which excess energy then stored in the transformer may be returned to the DC supply via the primary winding circuit.

As will be described more particularly below, such an inverter is capable of four-quadrant operation, wherein energy is supplied to the load during the first and third quadrants, and excess energy stored in the transformer or in the load may be returned to the DC supply for recharging it during the second and fourth quadrants. Besides permitting four-quadrant operation, the inverter of the present invention also permits fast and stable control.

The four-quadrant operation of the inverter provides particular advantages when used in an uninterrupted power supply and also in a standby power supply. Thus, it obviates the need for the provision of large separate chargers normally required in such systems in order to keep the back-up power supply fully charged. The invention is therefore described below also with respect to these applications.

Another preferred embodiment of the invention is also disclosed involving a different sequence of control. According to this embodiment, the primary winding control subcircuit opens the first switch at the beginning of each cycle and closes the first switch at a subsequent point in the cycle when, at the end of the respective cycle, the energy stored in the transformer would reach a predetermined value; and the secondary winding control subcircuit closes the second switch at the beginning of the respective cycle and opens the second switch when the voltage at the output of the secondary winding circuit reaches a predetermined value; such that a first interval is started by the opening of the first switch and closing of the second switch, during which energy in the transformer is delivered to the load; a second interval is started by the opening of the second switch during which excess energy in the transformer is returned to the power supply; and a third interval is started by the closing of the first switch during which energy is stored in the transformer.

It will thus be seen that in the first-described embodiment, the interval (therein Interval III) during which excess energy is delivered to the power supply is of fixed termination point; whereas in the latter embodiment this interval (Interval II), is of "floating" duration. That is, Interval II in the latter embodiment starts by the opening of the secondary winding switch (the "second switch"), when the voltage at the output of the secondary winding circuit reaches a predetermined value, and ends by the closing of the primary winding switch (the "first switch") at the point in the cycle when, at the end of the cycle, the energy stored in the transformer would reach a predetermined value. Such a "floating" arrangement for determining the interval during which excess energy stored in the transformer is delivered to the power supply, produces a more efficient and stable operation.

Further features and advantages of the invention will be apparent from the description below.

BRIEF DESCRIPTION OF THE DRAWINGS

The invention is herein described, by way of example only, with reference to the accompanying drawings, wherein:

FIG. 4 is a block diagram illustrating the main components of the control unit in the inverter of FIGS. 1, 2 and 2a;

FIG. 5 is a block diagram illustrating the primary winding control circuit in the block diagram of FIG. 4;

FIG. 7 is a block diagram particularly illustrating the construction of the flux level reference generator in the control unit of FIG. 4;

FIG. 8a illustrates another variation in the primary winding circuit of the transformer in the inverter of FIGS. 1-4, and FIGS. 8b and 8c illustrate variations in the secondary winding circuit of the transformer in the inverter of FIGS. 1-4;

FIG. 9 is a block diagram illustrating one form of uninterrupted power supply including the novel inverter of the present invention;

FIG. 10 illustrates another form of uninterrupted power supply including the novel inverter of the present invention;

FIG. 14 illustrates one form of magnetic flux- measuring circuit that may be used in the subcircuit of FIG. 13; and FIG. 15 illustrates one form of flux-demand estimator circuit that may be used in the magnetic flux-measuring circuit of FIG. 14, as well as in the circuit FIGS. 1-11.

DESCRIPTION OF PREFERRED EMBODIMENTS

Figure 1:
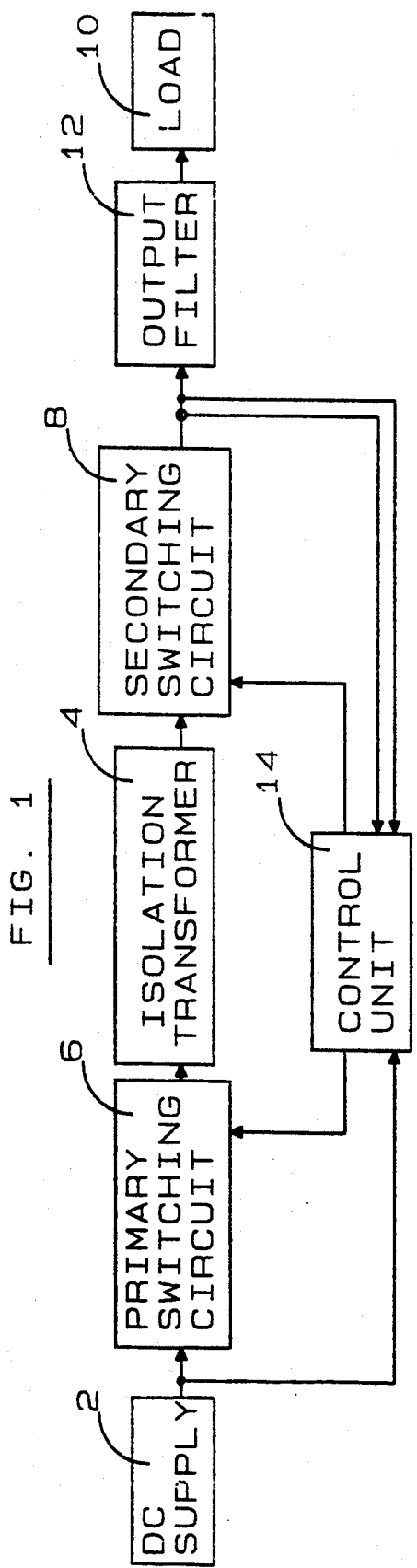
FIG. 1 is a block diagram illustrating the main components of an inverter constructed in accordance with the present invention.
Figure 2:
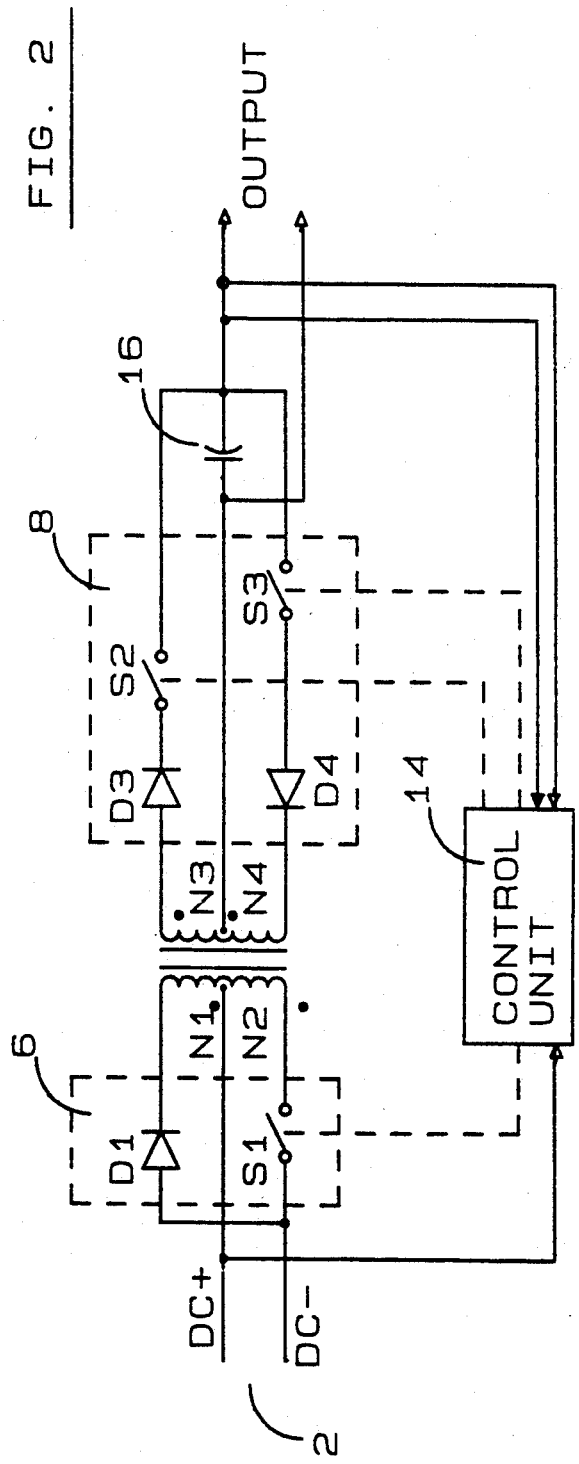
FIG. 2 is a diagram more particularly illustrating the components of the inverter in the system of FIG. 1.

Basic Construction of the Inverter (FIGS. 1 and 2)

FIG. 1 is a block diagram illustrating the main components of an inverter constructed in accordance with the present invention, and FIG. 2 more particularly illustrates those components.

Thus, the inverter comprises a DC battery supply 2, feeding power to a flyback transformer 4 via a primary winding switching circuit 6. The secondary winding of transformer 4 is controlled by a secondary winding switching circuit 8 so as to output the power to a load 10 via an output filter 12. A control unit 14 receives inputs from the input to the primary winding circuit of the transformer 4, and also from the output of the transformer secondary winding circuit to the load 10, and controls the primary winding switching circuit 6 and the secondary winding switching circuit 8 in response to such inputs.

FIG. 2 more particularly illustrates the main components of the inverter of FIG. 1. Thus, as shown in FIG. 2, transformer 4 includes two primary windings $N_1$, $N_2$ connected to the DC supply 2, and two secondary windings $N_3$, $N_4$ for supplying power to the load 10 via filter 12, and also via an output capacitor 16 connected to the output circuit of the transformer secondary windings. The load 10 may be a reactive load, so that it receives energy from the inverter during the first and third quadrants, and gives energy back to the inverter during the second and fourth quadrants. As shown by the polarity markings in FIG. 2, in the flyback transformer 4 thee current normally flows in the secondary windings $N_3$, $N_4$ when no current flows in the primary windings $N_1$, $N_2$, and no current flows in the secondary windings only when current flows in the primary windings.

The primary winding switching circuit shown by block 6 in FIG. 1 includes a switch $S_1$ between the DC supply and primary winding $N_2$, which switch is interrupted under the control of the control unit 14 for causing excess energy to be stored in the transformer. The primary winding switching circuit further includes a unidirectional conducting device or diode $D_1$, in series with the power supply and primary winding $N_1$. Diode $D_1$ is effective to deliver the stored excess energy back to the DC supply 2 during the second and fourth-quadrants as will be described more particularly below.

The secondary switching circuit indicated by block 8 in FIG. 2 includes two further switches $S_2$, $S_3$ poled in opposite directions by their respective unidirectional conducting devices $D_2$, $D_3$. One of these two switches would be active during each cycle of operation, depending on the sign of the output supplied by the inverter to the load. Thus, if switch $S_3$ is the active one, switch $S_2$ would be continuously open, and switch $S_3$ would be closed during precise Intervals of each cycle to output pulses on one sign; whereas if switch $S_2$ is the active one, switch $S_3$ would be continuously open and switch $S_2$ would be closed at precise Intervals to output pulses of the opposite sign.

Switches $S_1$, $S_2$, $S_3$ are controlled by control unit 14 in such a manner as to achieve four-quadrant operation with fast control. The four-quadrant operation is permitted by the addition of the abovementioned diode $D_1$ in the primary winding circuit, such that diode $D_1$ provides a path for charging the battery supply 2 at a certain Interval during each cycle in which the energy, stored in the transformer and not used in the load, is returned to the battery supply for charging it.

Figure 3:
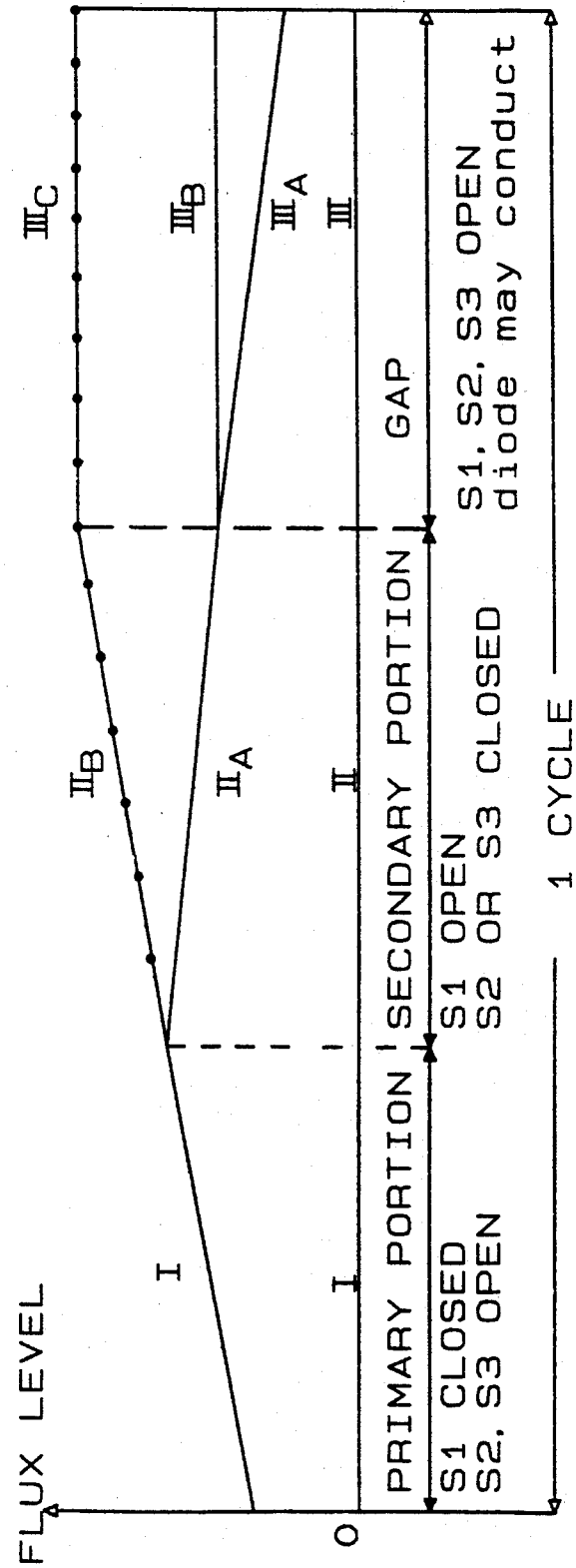
FIG. 3 is a magnetic flux diagram helpful in explaining the operation of the inverter of the present invention.

Magnetic Flux Diagram (FIG. 3)

The manner in which the above-described four-quadrant operation is accomplished will be better understood by reference to the magnetic flux diagram illustrated in FIG. 3, which shows what occurs during each cycle. Thus, each cycle is divided into three Intervals I, II, III, as follows:

Interval I is an energy storing or accumulation Interval, in which excess energy is stored in the transformer. This Interval is started by closing switch $S_1$ at the beginning of a cycle when switches $S_2$ and $S_3$ are both open, so that current in the primary winding $N_2$ starts to build up according to the following equation:

$$I_p = I_{op} + (V_{dc} \cdot t)/L_p$$

wherein: $I_p$ is the instantaneous current in the primary winding $N_2$; $I_{op}$ is the starting current; $V_{dc}$ is the battery voltage; and $L_p$ is the inductance of primary winding $N_2$.

Interval II is normally an energy-delivering Interval and is started by the opening of switch $S_1$ and the closing of the active switch $S_2$ or $S_3$, depending on the sign of the output current. During Quadrants 1 and 3 of this Interval, the excess energy stored in the transformer is used for charging the capacitor 16 (FIG. 2) for delivery to the load (10, FIG. 1) via the secondary winding $N_3$ or $N_4$, depending on whether switch $S_2$ or $S_3$ is the active one and is closed. During Quadrants 1 and 3 of Interval II, the current in the secondary winding decreases with time, as shown by descending line IIa, as follows:

$$I_s = I_{os} - (V_{out} \cdot t)/L_s$$

wherein: $I_s$ is the instantaneous current in the secondary winding; $I_{os}$ is $I_{op}(N_p/N_s)$.

On the other hand, if the load is a reactive load, energy from the load is stored during Quadrants 2 and 4 in the transformer. Thus, the excess energy from the load is stored in the transformer, as shown by ascending line IIIb, according to the following equation:

$$I_s = I_{os} - (-V_{out} \cdot t)/L_s$$

Interval III starts by closing the active switch $S_2$ or $S_3$, whichever one had been closed in Interval II according to the sign of the output, switch $S_1$ in the primary winding circuit remaining open. Accordingly, all the switches are open. During this Interval, the excess of energy not delivered to the load may return to the DC supply 2 via diode $D_1$ and primary winding $N_1$, the current through the latter winding decreasing as follows:

$$I_d = I_{od} - (V_{dc} \cdot t)/L_p$$

wherein: $I_d$ is the instantaneous current through diode $D_1$ and winding $N_1$ to the battery supply 2; $I_{od}$ is the starting current through winding $N_1$; and $L_p$ is the inductance of the primary winding $N_1$.

With respect to Interval III, descending line IIIa in FIG. 3 thus describes the excess energy returned to the power supply, via the diode $D_1$ and primary winding $N_1$, during Quadrants 2 and 4, whereas descending line IIIc describes the excess energy returned to the power supply during Quadrants 2 and 4 in a reactive load.

Figure 2A:
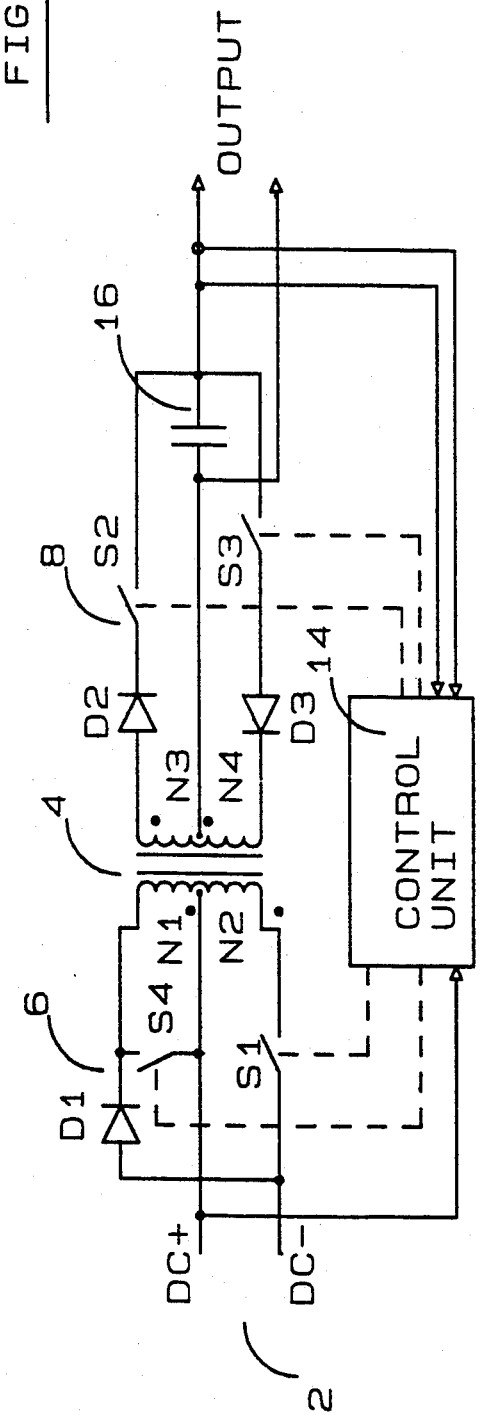
FIG. 2a illustrates a variation in the primary winding circuit of the inverter of FIG. 2.

In some cases, however, there may be no need to return energy back to the DC power supply. In such a case the energy may merely be retained within the transformer, as shown by horizontal line IIIb in FIG. 3. FIG. 2a illustrates an arrangement of the primary winding circuit that may be used for effecting the operation illustrated by the horizontal line IIIc in FIG. 3.

Thus, the primary winding circuit shown in FIG. 2a also includes primary winding $N_1$ containing diode $D_1$ and primary winding $N_2$ containing switch $S_1$, as in FIG. 2. However, it includes an additional switch $S_4$ which is closed at the beginning of Interval III (FIG. 3) in order to short circuit winding $N_1$, and thereby to preserve in the transformer the excess energy not delivered to the load during Interval II.

Control Circuit 14 (FIGS. 4-7)

Figure 6:
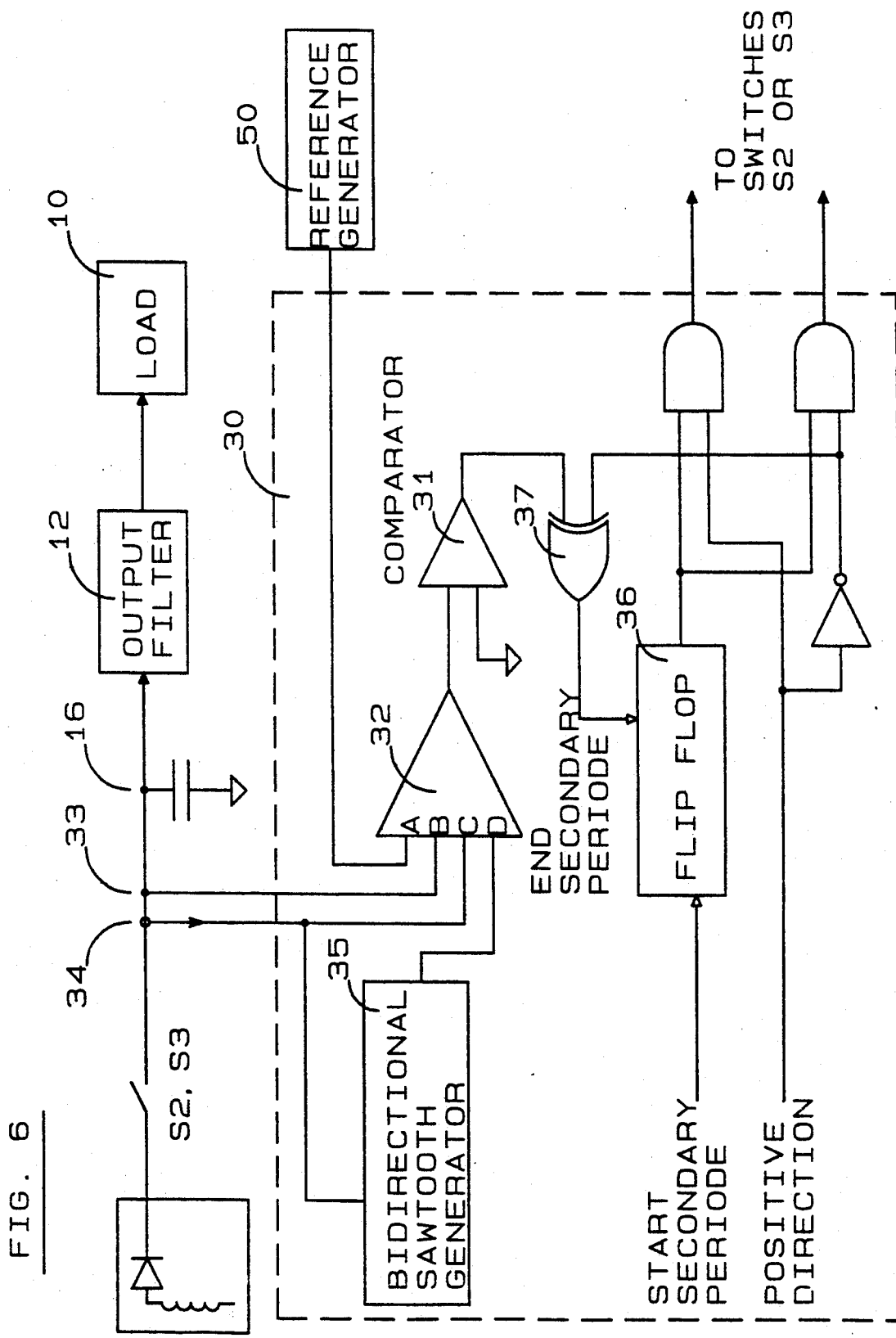
FIG. 6 is a block diagram illustrating the main components of the secondary winding control circuit in the control unit of FIG. 4.

FIG. 4 illustrates the control circuit 14 which is used for controlling the switches $S_1$, $S_2$ and $S_3$ in the primary and secondary winding circuits illustrated in FIG. 2, and also switch $S_4$ in the modification to the primary winding circuit illustrated in FIG. 2a if that modification is used. FIGS. 5-7 illustrate more particulars of the various components used in control circuit 14.

Briefly, control circuit 14 includes a primary winding control subcircuit 20 (more particularly illustrated in FIG. 5) which controls switch $S_1$ in the primary winding circuit; a secondary winding control subcircuit 30 (more particularly illustrated in FIG. 6) which controls switches $S_2$ and $S_3$; a flux level reference generator 40 (more particularly illustrated in FIG. 7); and a reference voltage generator 50, which controls the secondary winding control subcircuit 30. The primary winding control subcircuit 20 is effective to sense the energy stored in the transformer and to open switch $S_1$ when the stored energy reaches a predetermined value as fixed by the flux level reference generator 40; and the secondary winding control subcircuit 30 is effective to sense the output voltage in the secondary winding circuit of the transformer and to open the active switch $S_2$ or $S_3$ (depending on the polarity of the output) when the output voltage reaches a predetermined value as fixed by the reference voltage generator 50.

FIG. 5 more particularly illustrates the primary winding control subcircuit 20. It includes a current sensor 21 for sensing the current through switch $S_1$ in the primary winding circuit, and a comparator 22 which receives the latter sensed current. Comparator 22 also receives a signal from the flux level reference generator 40 which, as described above, fixes the predetermined value to be reached by the stored energy when switch $S_1$ is to be opened to end the energy-storing Interval I and to start the energy-delivering Interval II. Comparator 22 compares the sensed current from sensor 21, and the predetermined value fixed by the flux level reference generator 40, and actuates a flip-flop 23 to open switch $S_1$ when the two values are equal. Thus, flip-flop 23 is set at the start of each cycle when switch $S_1$ is closed, and is reset by the output from comparator 22, when the two values sensed by the comparator are equal, to open switch $S_1$.

FIG. 6 illustrates the secondary winding control subcircuit represented by box 30 and also by the reference voltage generator 50 in FIG. 4. As briefly described above, this secondary winding controlled subcircuit senses the output voltage in the secondary winding circuit of the transformer, and when the output voltage reaches a predetermined value as fixed by the reference voltage generator 50, opens the active secondary-winding, switch $S_2$, $S_3$ (depending on the polarity of the output voltage), to thereby end the energy-delivering Interval II and to start Interval III during the which the excess energy is delivered back to the DC supply via diode $D_1$ and primary winding $N_1$ (FIG. 2).

The secondary winding control subcircuit illustrated in FIG. 6 includes a comparator 31 connected to a differential amplifier 32 which receives a first input A from the reference voltage generator 50, and a second input B from the output side 33 of the active secondary-winding switch, $S_2$ or $S_3$, so as to sense the output voltage of the inverter.

In order to improve both the stability of the inverter and its tracking capabilities, differential amplifier 32 connected to comparator 31 includes two further inputs, namely: a third input C from a correction offset signal generator 34, which senses the output current and generates a correction offset signal proportional thereto; and a fourth input D from a bidirectional sawtooth generator 35, which generates a signal whose magnitude and sign are a function of the output current. Accordingly, the differential amplifier 32 will produce, from all the foregoing inputs, an output signal $(\alpha A + \beta B + \gamma C + \delta D)$, which signal is applied to comparator 31.

Comparator 31 thus produces an output signal when the output voltage from the inverter reaches the predetermined value fixed by the reference voltage generator 50. This output signal is applied to a flip-flop 36, which is set at the beginning of the energy-delivering Interval II, and reset by the output from the comparator 31 at the end of the energy-delivering Interval II. Ending of Interval II starts the recharging Interval III during which the DC power supply 2 is recharged by the excess energy stored in the transformer during Interval I and not delivered to the load during Interval II.

The secondary winding control subcircuit 30 illustrated in FIG. 6 further includes an EXCLUSIVE-OR circuit 37 which operates as a gate to invert (or not invert) the comparator signal according to the quadrant of the output voltage. That is, if the output voltage is negative, it is inverted; and if positive, it is not inverted. Circuit 37 could be omitted if the values inputted into comparator 31, via its differential amplifier 32, are absolute values.

As explained earlier, the speed and the stability of the inverter control are achieved through the existence of an Interval (namely Interval III) during which diode $D_1$ is conducting. Interval III is actually the remainder of the cycle, after the completion of the energy-storing Interval I and the energy-delivering Interval II, during which all of the switches $S_1$, $S_2$ or $S_3$ are open. The flux reference generating circuit 40, which controls the primary winding control subcircuit 20 (FIG. 4), is used for this purpose.

The flux level reference generator 40, as illustrated in FIG. 7, includes a sensor 41 for sensing the absolute value of the output voltage, which is applied as a first input A into a differential amplifier 42 functioning as a subtractor circuit. Differential amplifier 42 includes a second input B from the reference voltage generator 50, converted to an absolute value by circuit 43. The latter circuit subtracts input B from input A, and thereby produces an output signal representing the difference between the required output voltage and the actual output voltage. This signal is fed to an integrator 44 via diode 45 which increases the flux level reference signal used for controlling the instant of opening of switch $S_1$ to terminate the energy-storing Interval I.

On the other hand, this latter reference signal is decreased according to an exponential decay during Interval III during when all of the switches $S_1$, $S_2$ or $S_3$ are open. The flux reference signal outputted from integrator 44 is coupled to its input via switch 46 which is closed during Interval III by the control circuit 14.

It will thus be seen that when the energy outputted from the inverter is too low, the absolute value of input A will be smaller than that of input B during the energy-storing Interval I; accordingly, the voltage at the output of the voltage amplifier 42 will be negative, thereby supplying a negative input to the integrator 44. When the input to the integrator is negative, its output increases positively. This increases the output of the flux reference signal which closes switch $S_1$ in the primary winding circuit for a longer period of time, thereby accumulating more energy in the energy-storing Interval I. The above arrangement thus corrects the inverter circuit when the output voltage is too low because the energy stored in the transformer is too low.

However, when the energy stored in the transformer is too high, the output voltage of the inverter circuit will not be affected because that is controlled by the comparator. However, Interval III becomes too long because the output capacitor 16 (FIG. 2) charges at a faster rate when the energy being delivered is too high. The output of the integrator 44 is always connected to its input during Interval III, producing an exponential decay. Therefore, if Interval III becomes too long, the exponential decay significantly reduces the flux level reference signal outputted at 48 to control the transformer primary winding switch $S_1$.

Variations in the Primary and Seconding Winding Circuits (FIGS. 2a, 8a–8c)

FIG. 2a described above illustrates a variation that may be made in the transformer primary winding circuit when it is not necessary to use the excess energy in Interval III for recharging the power supply. FIG. 8a illustrates another variation that may be used in the transformer primary winding circuit; and FIGS. 8b and 8c illustrate variations that may be made in the transformer secondary winding circuit.

Thus, FIG. 8a illustrates the use of two diodes $D_{1a}$, $D_{1b}$ and the two switches $S_{1a}$, $S_{1b}$ in the transformer primary winding circuit, instead of a single diode $D_1$ and a single switch $S_1$. During the normal operation, both switches $S_{1a}$, $S_{1b}$ would be opened and closed together. However, if it is desired to short-circuit a winding in the primary winding circuit, as described above with respect to FIG. 2a in order to save the excess energy in the transformer and not to use it for recharging power supply, one of the switches (e.g., $S_{1b}$) may be used as switch $S_4$ in FIG. 2a for this purpose.

FIG. 8b illustrates a variation that may be made in the transformer secondary winding circuit, wherein, instead of using two unidirectional switches $S_2$, $D_2$ and $S_3$, $D_3$, the secondary winding circuit includes a bridge having four arms with a unidirectional switch in each of the four arms. Thus, two arms include the two switches $S_{2a}$, $S_{2b}$ and their diodes $D_{2a}$, $D_{2b}$, corresponding to switch S₂ and diode D₂ in FIG. 2; and the other two arms include switches S$_{3a}$, S$_{3b}$ and diodes D$_{3a}$, D$_{3b}$, corresponding to switch S₃ and diode D₃ in FIG. 2.

FIG. 8c illustrates a further variation in the secondary winding circuit including two unidirectional switches, comprising S₂' and D₂' in series with one secondary winding and N₃', and switch S₃' and diode D₃' in series with the other secondary winding N₄'.

Figures 9, 10:
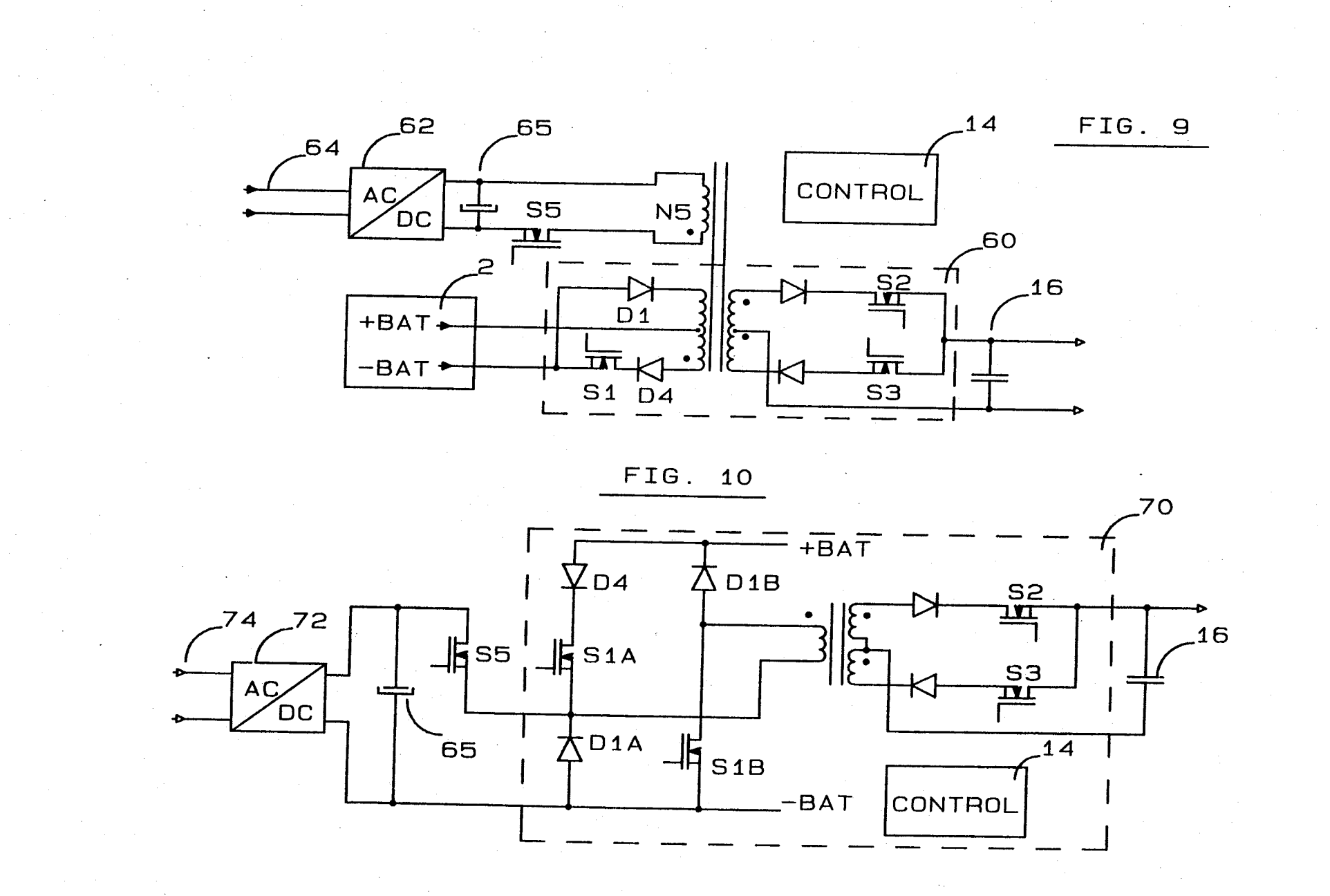

Uninterruptable Power Supply (FIGS. 9 and 10)

The above described inverter is particularly useful for uninterruptable power supplies, Thus, by merely adding a winding and a switch, the inverter obviates the need for a separate charger required in the conventional uninterruptable power supply. FIGS. 9 and 10 illustrate two systems which may be used for this purpose.

The system illustrated in FIG. 9 is one wherein the input, output and battery are all voltaicly isolated from each other and from the line.

In FIG. 9, the inverter as described above, and as illustrated particularly in FIG. 2, is included within box 60, and the elements therein corresponding to those in FIG. 2 are identified by the same reference characters to facilitate understanding. To enable the inverter 60 to be used as an uninterruptable power supply it is only necessary to add a further switch S₅, and a further coil N₅ in the primary winding circuit of the transformer in the inverter and series-connected to the rectifier 62 of the power supply mains 64.

During normal operation of the circuit, the power is supplied from the power supply mains 64, rectifier 62, and reservoir capacitor 65, to the load via the output capacitor 16. During this operation, switch S₅ is controlled, instead of switch S₁. That is, switch S₅ is closed at the beginning of the cycle in order to start the energy-storing Interval I, and is opened to terminate that Interval and to start Interval II. During this normal operation, the active secondary winding switch S₂ or S₃ (according to the polarity of the output voltage desired) is controlled as described above, the active switch being closed to start Interval II, and being opened to end that Interval and to start Interval III, during which the excess energy not delivered to the load may used for recharging the DC power supply. During Interval III, the battery 2 of the inverter 60 may be recharged via diode D₁ in the same manner as described above with respect to FIG. 2.

Now, should there be an interruption in the supply mains 64, the battery supply 2 is now used for supplying the load in the same manner as described above with respect to FIG. 2.

FIG. 10 illustrates another arrangement wherein the inverter, therein designated 70, is used in an uninterruptable power supply. In the system illustrated in FIG. 10, the battery of the inverter is voltaicly coupled to the supply mains 74 via its rectifier 72, so that the battery is continuously and controllably charged by excess energy not delivered to the load and returned to the battery in Interval III as described above.

During the normal operation of the system, when the load is supplied from the supply mains 74 via rectifier 72, the additional switch S₅, corresponding to switch S₅ in FIG. 9, is controlled in the same manner as described above with respect to switch S₁; that is, it is closed at the start of each cycle and is opened at the end of the energy-storing Interval I. During this normal operation, the active secondary-winding switch S₂ or S₃ in the secondary winding circuit is controlled in the same manner as described above with respect to FIG. 2, the active switch being closed at the start of Interval II and being reopened at the end of that Interval and at the start of Interval III when the excess energy may be returned to the battery.

However, when the mains supply 74 is interrupted, switches S$_{1a}$ and S$_{1b}$ are now used for controlling the transformer primary winding circuit, being closed at the start of the energy-storing Interval I and opened at the end of that Interval and the start Interval II, in the same manner as described above with respect to FIG. 2.

It will be noted that the primary winding circuit in the system illustrated in FIG. 2 is similar to that illustrated in FIG. 8a. It will be appreciated, however, that it could be of other constructions, such as that illustrated in FIG. 2 or 2a.

Standby Power Supply (FIG. II)

Figure 11:
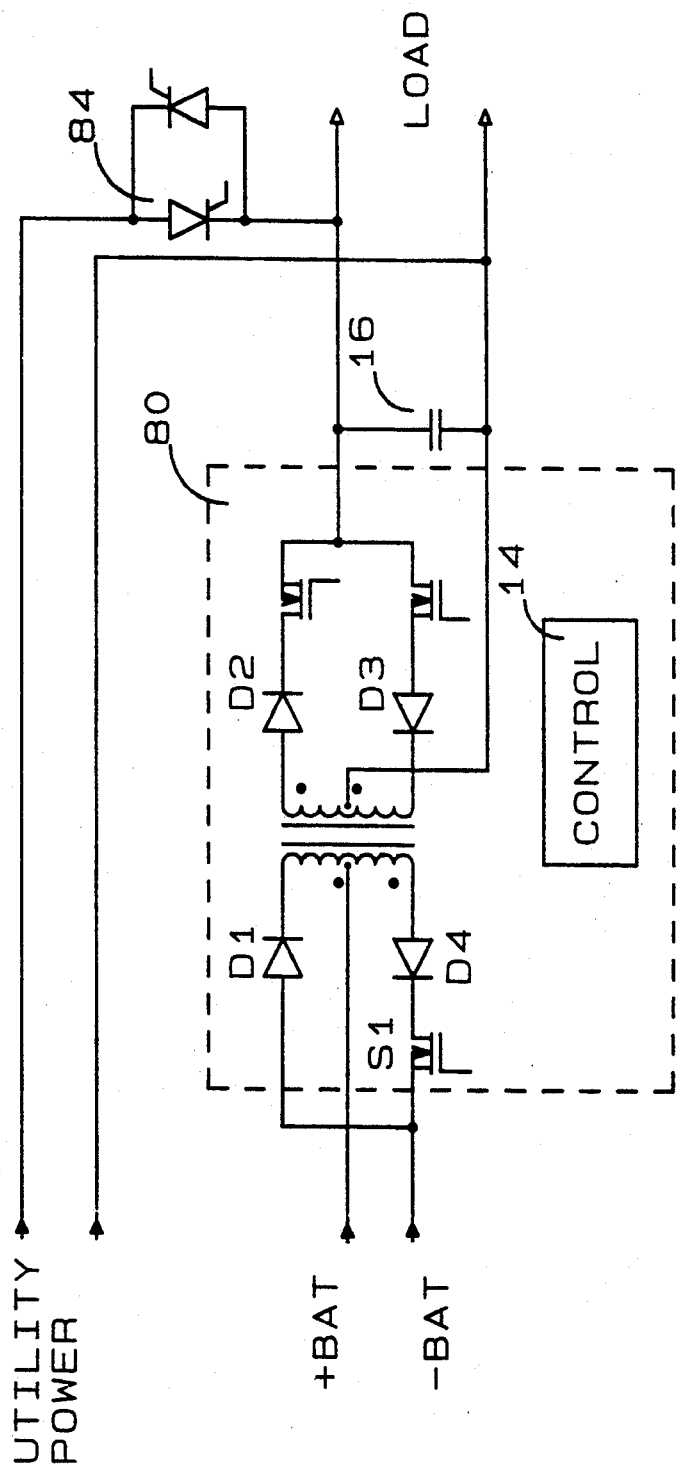
FIG. 11 illustrates a power standby supply including the novel inverter of the present invention.

The four-quadrant operation of the illustrated inverter makes it particularly useful in a standby power supply FIG. 11 illustrates one such arrangement wherein the inverter, indicated by the elements within block 80, is substantially of the same construction and operates in substantially the same manner as described above, and is connected to the load in parallel with the power supply mains 82.

In the configuration illustrated in FIG. 11, the inverter is connected in parallel with the power supply mains by a thyristor network 84 and operates at a somewhat lower voltage than the line voltage, so that the battery is charged during the operation of the system in a continuous manner in the second and fourth quadrants. However, whenever the power supply mains 82 fails to delivery the required line voltage, thyristor network 84 ceases to conduct, whereby the inverter circuit now supplies the power to the load and continues to do so until normal power is restored to the supply mains.

Figure 12:
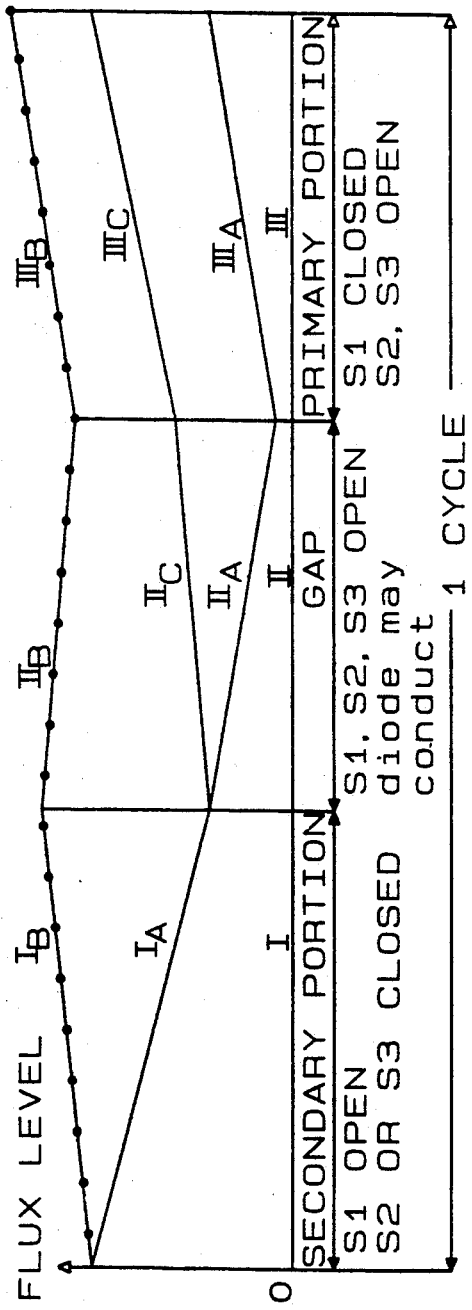
FIG. 12 is a magnetic flux diagram showing a modified sequence of control in the described embodiment.

Modified Sequence of Control (FIG. 12)

The magnetic flux diagram illustrated in FIG. 12 corresponds to the diagram illustrated in FIG. 3 except that, whereas in FIG. 3 the starting and termination points of the interval (therein Interval III) during which excess energy is delivered to the power supply are fixed in the cycle, in FIG. 12 this interval (therein designated Interval II) is not fixed for each cycle, but rather "floats". This requires that the control sequence be changed so that the cycle in the embodiment of the present application begins with conduction in the secondary winding circuit, rather than in the primary winding circuit.

More particularly, in the control sequence illustrated in FIG. 12 , the primary winding control circuit opens switch S₁ at the beginning of each cycle and closes switch S₁ at a subsequent point in the cycle when, at the end of the cycle, the energy stored in the transformer would reach a predetermined value; and the secondary winding circuit control subcircuit closes switch S₂ at the beginning of the cycle, and opens switch S₂ when the voltage at the output of the secondary winding circuit reaches a predetermined value. Thus, as shown in FIG. 12, a first interval (Interval I) is started by the opening of switch S₁ and closing of the active secondary winding switch (S₂ or S₃) during which energy in the transformer is delivered to the load; a second interval (Interval II) is started by the opening of the active switch S₂ or S₃ during which excess energy in the transformer is returned to the power supply; and a third interval (Interval III) excess energy is stored in the transformer. It will thus be seen that the excess energy delivered to the power supply occur during Interval II, which starts by the opening of switch S₂ when the voltage at the output of secondary winding which is a predetermined value; and this interval ends by the closing of switch S₁ at that point in the cycle when, at the end of the cycle, the energy stored in the transformer would reach a predetermined value. The latter point is thus a "predicted" point, and circuitry is provided, as will be described more particularly below, for predicting that point ending Interval II Thus, as seen in the diagram of FIG. 12, since during Interval I energy stored in the transformer is delivered to the load, the magnetic flux in the transformer decreases, as indicated by the descending line Ia; but if the load is reactive, then energy in the load is transferred to the transformer, as indicated by the ascending line Ib.

Interval II, when the excess energy in the transformer is delivered to the power supply, is normally indicated by the descending line IIa or IIb, respectively. However, if the modification illustrated in FIG. 2a is used, including a switch which short circuits one of the coils, then the level of the energy in the transformer stays constant, as indicated by line IIc.

Interval III in FIG. 12, when the energy stored in the transformer is delivered to the load, is indicated by the ascending line IIIa, IIIb or IIIc, respectively.

Figure 13:
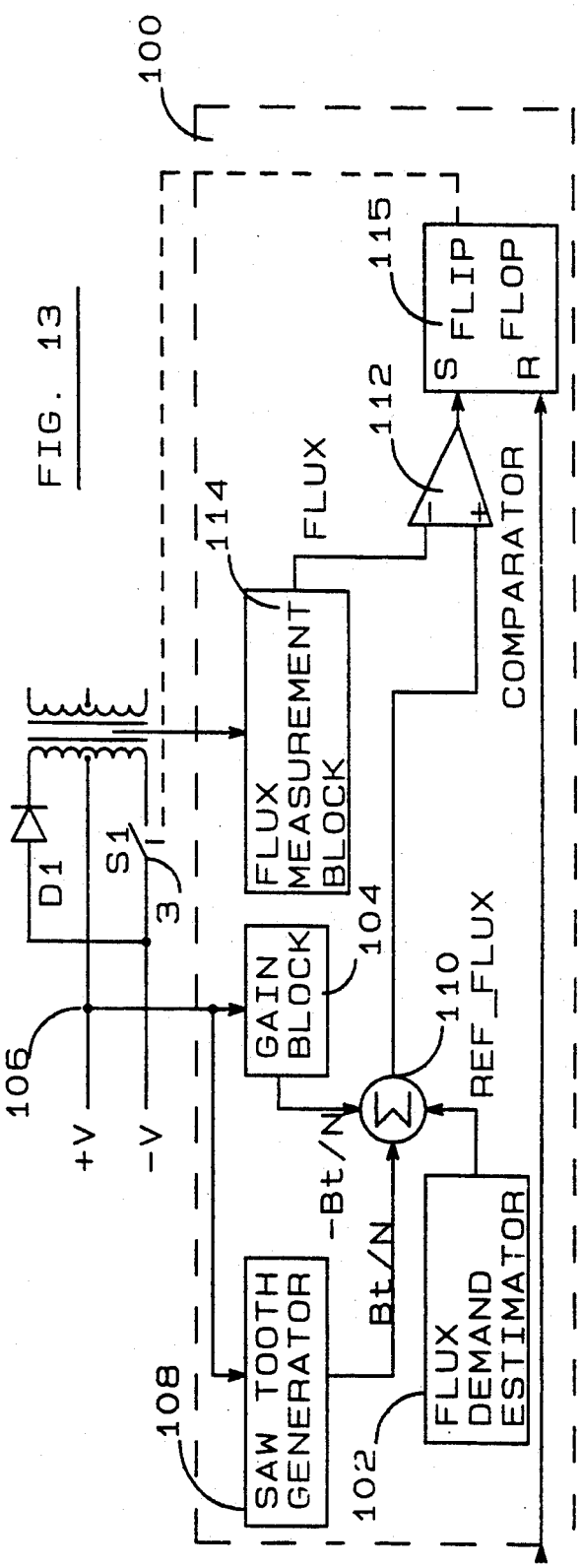
FIG. 13 is a block diagram illustrating the primary winding control subcircuit in the described embodiment.

Measurement of Transformer Magnetic Flux (FIG. 13)

FIG. 13 illustrates one form of primary winding control subcircuit, generally designated 100, that may be used for controlling switch S₁ in the primary winding circuit in accordance with the sequence illustrated by the diagram of FIG. 12. This circuit corresponds to circuit 20 in FIG. 5, but is designed so that it opens switch S₁ at the beginning of each cycle and closes the switch at a subsequent point in the cycle when, at the end of the cycle, the energy stored in the transformer would reach a predetermined value. This value is predetermined during each cycle by a flux demand estimator, generally designated 102 included in the primary winding control subcircuit 100, which generates a voltage corresponding to the required flux to satisfy the load. Preferably, the generated voltage corresponds to a reference flux depending on the load, but may also correspond to a constant reference flux.

More particularly, circuit 100 in FIG. 13 includes a "gain block" unit 104, which may be an amplifier or attenuator changing scales, connected across the input voltage, as shown by connection 106, to generate a voltage corresponding to the input voltage; and a sawtooth generator 108 also connected to the input voltage connection 106 for generating a further voltage also depending on the input voltage but varying with time. The three voltages produced by units 102, 104 and 108 are inputted into a summing circuit 110 which adds the outputs of the flux-demand estimator 102 and the sawtooth generator 108, and subtracts the output from the gain block circuit 104, to output a voltage which is applied to one input of a comparator 112.

The other input of comparator 112 is from a magnetic flux-measuring circuit 114, which outputs a voltage corresponding to the flux in the transformer T_r. Comparator 112 controls a flip-flop 115, which in turn controls the switch S₁ in the primary Winding of the transformer T_r.

Flip-flop 115 is reset at the beginning of each cycle to open switch S₁, and thus to end the energy-storing Interval I (line Ia or Ib, FIG. 12) during which the active switch (S₂ or S₃) in the secondary winding circuit is closed, so that energy stored in the transformer is delivered to the load. Switch S₁ remains open during Interval II (line IIa, IIb, or IIc, FIG. 12) when excess energy is delivered to the power supply, but closes to end Interval II at the subsequent point in the cycle when, at the end of the cycle, the energy stored in the transformer would reach a predetermined value as determined by comparator 112, which controls flip-flop 115 to close switch S₁, as described above. The closing of switch S₁, end Interval II, starts Interval III, during which energy is stored in the transformer, this interval being ended by the end of the cycle, when switch S₁ is opened by the resetting of flip-flop 115.

It will thus be seen that circuit 100 illustrated in FIG. 13 operates to close switch S₁ according to the following approximation equation:

$$FLX = REF\text{-}FLUX - \frac{V_b T}{N_o} + \frac{V_b t}{N_p}$$

wherein
FLX is the instantaneous flux in the transformer;
REF-FLUX is the flux to be established at the end of the cycle;
$V_b$ is the source voltage at the primary side;
$N_p$ is the number of turns of the primary winding;
T is the period of the cycle; and
t is the instantaneous time.

Thus, summing circuit 110 continuously adds the REF-FLUX from the flux-demand estimator 102 and the sawtooth signal from the sawtooth generator 108 (whose output is dependent on the source voltage and varies with time), and subtracts a fixed value from gain block 104, which is dependent on the source voltage; and applies this sum to one input of comparator 112. This sum is continuously compared with the FLUX from the flux-measurement block 114; and at the instant FLUX is smaller than the sum from the summation circuit 110, the flip-flop 115 is set to close switch S₁ in the primary winding, thereby ending Interval II during which excess energy is delivered to the power supply, and starting Interval III during which energy is stored in the transformer. Switch S₁ is reopened at the beginning of the next cycle by resetting of flip-flop 115.

Flux-Measurement Circuit (FIG.14)

Several methods are commonly known for measuring the magnetic flux in the core of a transformer. However, the known methods are generally difficult for pratical implementation in the described system.

FIG. 14 illustrates a flux-measurement system which may be used for block 114 in FIG. 13 for measuring the magnetic flux in the transformer Tr. This system is based on integrating the voltage measured across one of the windings of the transformer, and correcting the integration constant during the part of each cycle when switch S₁ is closed, by disabling the integration of the measured voltage and replacing momentarily the integration of the voltage by a known variable related to flux. In the described preferred embodiment, the voltage is measured across winding $N_D$ containing diode $D_1$; and the known variable which is related to flux, and which is momentarily replaced in the integration, is the current flowing through that winding. It will be appreciated, however, that the integration can be based on the voltage measured across any winding of the transformer, and that the known variable which is momentarily used in the integration process for correcting the integration constant may be another known variable related to the flux, e.g., current in another winding.

Thus, flux-measurement system illustrated in FIG. 14 includes an auxiliary winding Nd in the circuit including the diode $D_1$, for measuring the voltage across the transformer in order to perform the integration. The circuit in FIG. 14 further includes an inverting integrator, generally designated 120, comprising an amplifier 122, capacitor 124, and resistor 126, for integrating the voltage across the transformer as sensed by winding Nd. Circuit 120 further includes resistors 128 and 130, and switch $S_x$; switch $S_x$ is closed together with switch $S_1$ in the primary winding. The circuit illustrated in FIG. 14 further includes a current measuring circuit 132 for measuring the current in the primary winding of the transformer Tr.

It will be seen that the instantaneous output voltage ($V_{OUT}$) of the integrator circuit 120 is given by the expression:

$$V_{OUT} = -\frac{1}{RC} \int V dt + Const = -\frac{Nd}{RC} FLUX + Const.$$

When the current starts to flow in the primary winding, switch $S_x$ is closed, and the output voltage is forced to be proportional to the real flux. Thus, the integration circuit 120 integrates the measured voltage with respect to time; but when the primary winding switch $S_1$ is closed, switch $S_x$ is also closed so as to correct the integration constant, by disabling the integration of the measured voltage, and instead forcing the output to track the real current flow, i.e., the output of the current measuring circuit 132.

Regulating the Energy Level (FIG. 14)

In order to reduce the losses in the power circuits, the flux (current levels) should be kept as low as possible. This regulation may be implemented by two methods: one is by mathematically calculating REF-FLUX; and the other is by utilizing an energy dependent feedback system.

FIG. 14 illustrates an energy dependent feedback system. based on a mathematical calculation. For the mathematical calculation approach, the following three cases are distinguished:

(1) non-continuous flux in the transformer;
(2) continuous flux, with partial energy discharge during the respective interval; and
(3) continuous flux combined with flux (and energy) retention during this interval.

The mathematical expression presenting the conditions of case (3) is:

$$REF\text{-}FLUX = k_i \frac{(N_s V_i + N_p V_o)}{N_s V_i} I_o + k_2 \frac{N_s V_i V_o}{(N_s V_i + N_p V_o)}$$

wherein:
$V_i$ is the voltage of the voltage source;
$V_o$ is the output voltage;
$I_o$ is the output current;
$N_p$ is the number of turns of the primary winding;
$N_s$ is the number of turns of the secondary winding; and
REF-FLUX is the calculated reference flux.

FIG. 14 illustrates an electrical circuit for measuring the REF-FLUX according to the above mathematical expression.

Thus, the circuit includes two multiplier/divider circuits 140 and 142, and two summation circuits 144 and 146.

The expression ($k_1 I_o$) is inputted into multiplier circuit 140 and is multiplied by the output from summation circuit 144; the latter circuit sums Np multiplied by $V_o$, and $N_s$ multiplied by $V_i$. The product is divided by the quantity Np times Vi in circuit 140, and the output is applied to summation circuit 146.

The expression ($k_2 V_o$) is multiplied by $N_s$ and $V_i$ in circuit 142 and is divided by the output from summation circuit 144; and the result is outputted to the summation circuit 146. Thus, the REF-FLUX output from the latter circuit represents the sums of the outputs of the multiplier/divider circuits 140, 142.

While the invention has been described with respect to several preferred embodiments, it will be appreciated that many other variations, modifications and applications of the invention may be made.

What is claimed is:

1. An inverter for supplying electrical energy from a DC supply to a load, comprising:
   a transformer including a primary winding circuit coupled to the DC supply, and a secondary winding circuit coupled to the load;
   said primary winding circuit including a first controlled switch for interrupting the DC supply;
   said secondary winding circuit including at least a second, unidirectional controlled switch to produce an output of one sign when closed;
   said primary winding circuit further including an electrical device effective to return energy to the DC supply only and always when said first and second switches are open; and
   a control circuit for separately and independently controlling the operation of said first and second switches to open and close them, at the same frequency, such that during one interval in each cycle the switch in the primary winding is closed to produce an excess of energy which is stored in said transformer, and during another interval in each cycle the switches in the primary winding and the secondary winding are open and the excess energy stored in the transformer is returned to the DC supply, thereby permitting fast and stable control.

2. The inverter according to claim 1, wherein said control circuit includes:
   a primary winding control subcircuit effective to sense the energy stored in the transformer and to open said first switch when the stored energy reaches a predetermined value; and
   a secondary winding control subcircuit effective when said second switch is closed, to sense the output voltage in the secondary winding circuit of the transformer and to open said closed circuit switch when the output voltage reaches a predetermined value.

3. The inverter according to claim 2, wherein said transformer is a flyback transformer in which said primary and secondary winding circuits have polarities such that here is current flow in the secondary winding circuit when no current flows in the primary winding circuit, and no current flow in the secondary winding circuit when there is current flow in the primary winding circuit; and in which said secondary winding circuit also includes a third unidirectional switch poled in the opposite direction as said second switch, such as to produce, when it is the active switch in the secondary winding circuit and is closed, an output of the opposite sign as said second switch.

4. The inverter according to claim 2, wherein said control circuit further includes means for shorting a winding of the transformer when said first and second switches are open to retain in the transformer the excess energy not delivered to the load.

5. The inverter according to claim 2, wherein:

said primary winding control subcircuit closes said first switch at the beginning of the cycle to start a first interval, and opens said first switch when the stored energy reaches a predetermined value to end said first interval and to start a second interval;

said secondary winding control subcircuit closes said second switch at the start of the second interval and opens said second switch when the output voltage in the secondary winding circuit reaches a predetermined value to end said second interval and to start a third interval during which both said first and second switches are open, which third interval ends by the closing of said first switch at the end of the cycle and starting the first interval of the next cycle;

such that during said first interval, energy is stored in the transformer; during said second interval, energy stored in the transformer is delivered to the load; and during said third interval, excess energy is delivered to the power supply.

6. The inverter according to claim 2, wherein said primary winding control subcircuit includes:

a flux level reference generator for fixing said predetermined value of stored energy;

a current sensor for sensing the current through said first switch in the primary winding circuit;

a comparator for comparing the latter sensed current with the predetermined value fixed by said flux level reference generator; and switch actuator means for opening said first switch in the primary winding circuit when the two values compared by said comparator are equal.

7. The inverter according to claim 6, wherein said switch actuator means comprises a flip-flop which is set to close said first switch at the start of each cycle, and which is reset to open said first switch by the output of said comparator when the two values sensed thereby are equal.

8. The inverter according to claim 6, wherein said secondary winding control subcircuit includes:

a reference voltage generator for fixing said predetermined voltage value;

a voltage sensor for sensing the voltage output of said secondary winding circuit of the transformer;

a comparator for comparing the latter sensed voltage with said predetermined voltage value; and switch actuator means for opening said closed second or third switch in the secondary winding circuit when the two values compared by said latter comparator are equal.

9. The inverter according to claim 8, wherein said secondary winding control subcircuit further includes means for improving both the stability of the inverter and its tracking capabilities, said latter means comprising:

a bidirectional sawtooth generator generating an electrical signal whose magnitude and sign are a function of the output current from the secondary winding circuit;

a correction offset signal generator for generating a correction offset signal proportional to the output current from the secondary winding circuit; and means for applying to said comparator in the secondary winding control subcircuit the outputs of both of said latter generators together with the outputs of said reference voltage generator and said voltage sensor.

10. The inverter according to claim 8, wherein said switch actuator means controlled by said comparator in the secondary winding circuit includes a flip-flop which is set when the active second or third switch is closed at the start of said second Interval, and which is reset by the output of said comparator when the output voltage in the secondary winding circuit reaches said predetermined value.

11. The inverter according to claim 7, wherein said flux level reference generator also includes means controlling said third Interval during which said unidirectional device in the primary winding circuit is conducting to return excess energy to the DC supply.

12. The inverter according to claim 11, wherein said last-mentioned means comprises:

an absolute voltage value sensing device for sensing the absolute voltage value outputted by the secondary winding circuit;

a subtractor device for subtracting the absolute voltage value from the reference voltage value fixed by said reference voltage generator in the secondary winding control circuit to produce a reference signal; and an integrator device producing an exponential decay in said reference signal and controlling the start of said third Interval in response thereto.

13. An uninterrupted power supply for supplying power from an AC supply mains to a load, comprising:

a rectifier circuit for converting the AC power of the supply mains to DC;

an inverter comprising:

a transformer including a primary winding circuit coupled to the DC supply, and a secondary winding circuit coupled to the load;

said primary winding circuit including a first contorted switch for interrupting the DC supply;

said secondary winding circuit including at least a second, unidirectional controlled switch to produce an output of one sign when closed;

said primary winding circuit further including an electrical device effective to return energy to the DC supply only and always when said first and second switches are open; and a control circuit for separately and independently controlling the operation of said first and second switches to open and close them, at the same frequency, such that during one interval in each cycle the switch in the primary winding is closed to produce an excess of energy which is stored in said transformer, and during another interval in each cycle the switches in the primary winding and the secondary winding are open and the excess energy stored in the transformer is returned to the DC supply, thereby permitting fast and stable control; and a coupling circuit for coupling the primary winding circuit of the transformer in the inverter to said supply mains via a line switch, such that during normal operation, the line supplies the power to the load and also charges the DC supply of the inverter, but upon failure of the supply mains, the DC supply of the inverter then supplies the power to the load.

14. The uninterrupted power supply according to claim 13, wherein the DC supply of the inverter is a battery which is not electrically connected to the line but is only magnetically coupled thereto by the inverter transformer so as to be charged only during the third Interval of the inverter operation.

15. The uninterrupted power supply according to claim 13, wherein the DC supply of the inverter is a battery which is electrically connected to the line so as to be continuously charged thereby during normal line operation.

16. A standby power supply for supplying power to a load in the event of interruption of the power supply mains, comprising:

an inverter comprising:
   a transformer including a primary winding circuit coupled to the DC supply, and a secondary winding circuit coupled to the load;
   said primary winding circuit including a first controlled switch for interrupting the DC supply;
   said secondary winding circuit including at least a second, unidirectional controlled switch to produce an output of one sign when closed;
   said primary winding circuit further including an electrical device effective to return energy to the DC supply only and always when said first and second switches are open; and
   a control circuit for separately and independently controlling the operation of said first and second switches to open and close them, at the same frequency, such that during one interval in each cycle the switch in the primary winding is closed to produce an excess of energy which is stored in said transformer, and during another interval in each cycle the switches in the primary winding and the secondary winding are open and the excess energy stored in the transformer is returned to the DC supply, thereby permitting fast and stable control;

an electronic switch normally connecting said inverter to the load in parallel to the power supply mains, such that the power supply mains normally supplies power to the load and also charges the DC supply in the inverter;

said electrical switch being effective upon failure of the power supply mains for automatically switching the load off the line and directly across the secondary winding circuit of the inverter such that the DC supply of the inverter then supplies the power to the load.

17. The inverter according to claim 2 wherein:
said primary winding control subcircuit opens first switch at the beginning of each cycle and closes said first switch at a subsequent point in the cycle when, at the end of the respective cycle, the energy stored in the transformer would reach a predetermined value; and
said secondary winding control subcircuit closes said second switch at the beginning of the respective cycle and opens said second switch when the voltage at the output of the secondary winding circuit reaches a predetermined value;
such that a first interval is started by the opening of said first switch and closing of said second switch, during which energy in the transformer is delivered to the load; a second interval is started by the opening of said second switch during which excess energy in the transformer is returned to the power supply; and a third interval is started by the closing of said first switch during which energy is stored in the transformer.

18. The inverter according to claim 17, wherein said subsequent point in the cycle when said first switch is closed is determined by circuitry which includes:
   first means for generating a first value corresponding to a reference flux;
   second means for generating a second value corresponding to the input voltage;
   third means for generating a third value corresponding to the input voltage but varying with time;
   fourth means for generating a fourth value equal to said first value and said second value minus said third value;
   a magnetic flux-measuring circuit for generating a fifth value corresponding to the magnetic flux in the transformer; and
   a comparator for closing said first switch when said fifth value is smaller than said fourth value.

19. The inverter according to claim 18, wherein said first means comprises a flux-demand estimator generating a first voltage corresponding to a constant reference flux.

20. The inverter according to claim 18, wherein said first means comprises a flux-demand estimator generating a first voltage corresponding to a reference flux depending on the load.

21. The inverter according to claim 18, wherein said second means comprises a voltage generator generating a second voltage corresponding to the input voltage applied across the primary winding.

22. The inverter according to claim 21, wherein said third means comprises a sawtooth signal generator generating a sawtooth voltage varying with time and having an amplitude varying with said input voltage applied across the primary winding.

23. The inverter according to claim 18, wherein said primary winding control subcircuit includes:
   a first voltage generator, serving as a flux-demand estimator generator, for generating a first voltage corresponding to a reference flux;
   a second voltage generator for generating a second voltage corresponding to the voltage across the primary winding;
   a sawtooth signal generator for generating a third voltage varying with time and having an amplitude varying with the voltage across the primary winding;
   a summing circuit for summing the above generated voltages;
   a magnetic flux-measuring circuit for measuring the magnetic flux in the transformer and for generating a voltage corresponding thereto;
   a comparator for comparing the voltage of said magnetic flux-measuring circuit with the voltages summed by said summing circuit; and
   a switch actuator for closing said first switch in the primary circuit when the voltage of said magnetic-flux measuring circuit is smaller than the voltages summed by said summing circuit.

24. The inverter according to claim 23, wherein said switch actuator comprises a flip-flop which is set by the output of said comparator, and reset at the start of each cycle.

25. The inverter according to claim 18, wherein said magnetic flux- measuring circuit comprises:
voltage measuring means for measuring the voltage across a winding of the transformer;
integrating means for integrating the latter measured voltage with respect to time; and
correction means for correcting the integration constant during a part of each cycle when said first switch is closed, by disabling the integration of the measured voltage by said integrating means.

26. The inverter according to claim 25, wherein said correction means is effective, when said first switch is closed, to replace momentarily the integration of the voltage by a known variable related to flux.

27. The inverter according to claim 26, wherein said correction means comprises a current measuring circuit for measuring the current through one of the windings, which measured current is used as said known variable.

28. The inverter according to claim 27, wherein said integrating means comprises: an operational amplifier; an R C circuit connected to the operational amplifier to integrate its output; and a further electrical switch connected across said operational amplifier to shut out its R-C circuit and to integrate the output of the current measuring means, instead of the voltage measuring means, during the part of each cycle when said first switch is closed.

29. The inverter according to claim 27, wherein said flux-demand estimator generator comprises means for measuring the reference flux according to the following relationship:

$$REF\text{-}FLUX = k_i \frac{(N_s V_i + N_p V_o)}{N_s V_i} I_o + k_2 \frac{N_s V_i V_o}{(N_s V_i + N_p V_o)}$$

wherein:
$V_i$ is the voltage of the source applied to the primary winding;
$V_o$ is the output voltage;
$I_o$ is the output current from the secondary winding;
$N_p$ is the number of turns of the primary winding;
$N_s$ is the number of turns of the secondary winding; and
$k_1$ and $k_2$ are constants.

* * * * *